US010609196B2

(12) United States Patent
Gan et al.

(10) Patent No.: US 10,609,196 B2
(45) Date of Patent: Mar. 31, 2020

(54) METHOD AND APPARATUS FOR CONTROLLING APPLICATION PROGRAM, AND ELECTRONIC DEVICE

(71) Applicant: Huawei Technologies Co., Ltd., Shenzhen (CN)

(72) Inventors: Yuanli Gan, Shenzhen (CN); Xiaochen Chen, Shanghai (CN); Rui Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/514,404

(22) PCT Filed: Sep. 26, 2014

(86) PCT No.: PCT/CN2014/087555
§ 371 (c)(1),
(2) Date: Mar. 24, 2017

(87) PCT Pub. No.: WO2016/045088
PCT Pub. Date: Mar. 31, 2016

(65) Prior Publication Data
US 2017/0295272 A1    Oct. 12, 2017

(51) Int. Cl.
*H04M 1/60*    (2006.01)
*H04M 1/725*    (2006.01)
*H04M 19/04*    (2006.01)

(52) U.S. Cl.
CPC ......... *H04M 1/605* (2013.01); *H04M 1/6041* (2013.01); *H04M 1/6066* (2013.01); *H04M 1/725* (2013.01); *H04M 1/72569* (2013.01); *H04M 19/04* (2013.01); *H04M 2250/12* (2013.01)

(58) Field of Classification Search
CPC . H04M 1/6041; H04M 1/605; H04M 2250/12
See application file for complete search history.

(56) References Cited

U.S. PATENT DOCUMENTS 8,195,220 B2    6/2012    Kim et al.
2003/0162560 A1    8/2003    Kaneko
2008/0212753 A1    9/2008    Yoshizawa
(Continued)

FOREIGN PATENT DOCUMENTS

CN    101895799 A    11/2010
CN    101917514 A    12/2010
(Continued)

*Primary Examiner* — David Bilodeau
(74) *Attorney, Agent, or Firm* — Slater Matsil, LLP

(57) ABSTRACT

Embodiments of the present invention relate to telecommunications technologies. A sensor is disposed on at least one of the electronic device or the external audio device. The method includes receiving, by the electronic device, a detection result signal sent by the sensor, where the detection result signal is a signal that carries a detection value obtained by means of detection by the sensor and determining, by the electronic device according to a preset correspondence and the detection value, an action performed by a user on the electronic device or the external audio device. The method also includes controlling, by the electronic device, an execution status of an audio and video application program according to the action.

19 Claims, 5 Drawing Sheets

(56) References Cited

U.S. PATENT DOCUMENTS

| | | | |
|---|---|---|---|
| 2009/0197615 A1 | 8/2009 | Kim et al. | |
| 2010/0130132 A1* | 5/2010 | Lee | H04B 5/02 |
| | | | 455/41.3 |
| 2011/0223974 A1* | 9/2011 | Agevik | G06F 1/1626 |
| | | | 455/566 |
| 2012/0053715 A1 | 3/2012 | McKillop et al. | |
| 2013/0094659 A1 | 4/2013 | Liu | |
| 2013/0114823 A1* | 5/2013 | Kari | H04R 1/1041 |
| | | | 381/74 |
| 2014/0122090 A1 | 5/2014 | Park | |
| 2014/0191948 A1* | 7/2014 | Kim | G06F 3/0483 |
| | | | 345/156 |
| 2014/0314247 A1 | 10/2014 | Zhang | |
| 2015/0086055 A1 | 3/2015 | Kato | |

FOREIGN PATENT DOCUMENTS

| | | |
|---|---|---|
| CN | 102981741 A | 3/2013 |
| CN | 103024193 A | 4/2013 |
| CN | 202873023 U | 4/2013 |
| CN | 103257873 A | 8/2013 |
| CN | 103517177 A | 1/2014 |
| EP | 2775693 A2 | 9/2014 |
| JP | 2003258944 A | 9/2003 |
| JP | 2008187221 A | 8/2008 |
| JP | 2013247620 A | 12/2013 |
| KR | 20060106299 A | 10/2006 |
| KR | 20090100194 A | 9/2009 |
| KR | 20140010845 A | 1/2014 |
| KR | 20140054960 A | 5/2014 |
| WO | 2014078986 A1 | 5/2014 |

\* cited by examiner

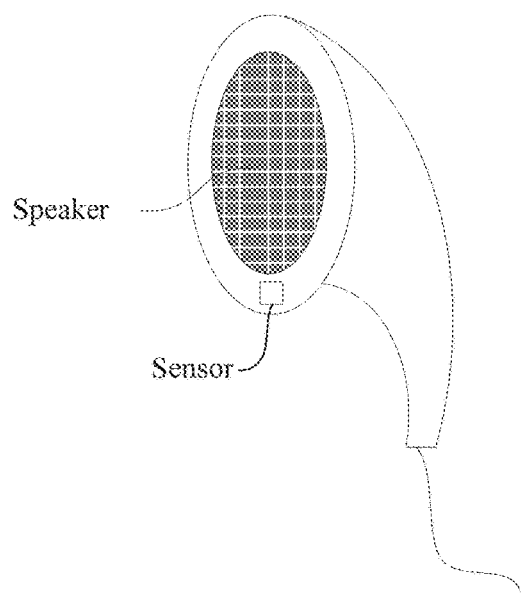

FIG. 1

| S21: An electronic device receives a detection result signal sent by a sensor that is disposed on at least one of the electronic device or an external audio device, where the detection result signal carries a detection value obtained by means of detection by the sensor |

| S22: The electronic device determines, according to a preset correspondence between a user action and a detection value and according to the detection value carried in the detection result signal, an action performed by the user on the electronic device or the external audio device |

| S23: The electronic device controls an execution status of an audio and video application program according to the action performed by the user on the electronic device or the external audio device |

FIG. 2

```
┌─────────────────────────────────────────────────────────────────┐
│ A mobile phone receives a detection result signal sent by a     │  S41
│ sensor on the mobile phone, where the detection result signal   │
│ carries a detection value that is obtained by means of          │
│ detection by the sensor                                         │
└─────────────────────────────────────────────────────────────────┘
                                  │
┌─────────────────────────────────────────────────────────────────┐
│ The mobile phone determines, according to a preset range and    │  S42
│ the detection value that is carried in the detection result     │
│ signal, an action performed by a user on the mobile phone       │
└─────────────────────────────────────────────────────────────────┘
                                  │
┌─────────────────────────────────────────────────────────────────┐
│ When the mobile phone receives an incoming call and the action  │  S43A
│ performed by the user on the mobile phone is moving the mobile  │
│ phone close to a user head, the mobile phone automatically      │
│ answers the call and controls call audio to be output from a    │
│ built-in earpiece of the mobile phone                           │
└─────────────────────────────────────────────────────────────────┘
┌─────────────────────────────────────────────────────────────────┐
│ When the mobile phone is in a call and the action performed by  │  S43B
│ the user on the mobile phone is moving the mobile phone close   │
│ to a user head, the mobile phone controls call audio to be      │
│ output from a built-in earpiece of the mobile phone             │
└─────────────────────────────────────────────────────────────────┘
┌─────────────────────────────────────────────────────────────────┐
│ When the mobile phone is in a call and the action performed by  │  S43C
│ the user on the mobile phone is moving the mobile phone away    │
│ from a user head, the mobile phone controls call audio to be    │
│ output from an external audio device                            │
└─────────────────────────────────────────────────────────────────┘
```

FIG. 4

METHOD AND APPARATUS FOR CONTROLLING APPLICATION PROGRAM, AND ELECTRONIC DEVICE

CROSS-REFERENCE TO RELATED APPLICATIONS

This application is a National Stage of International Application No. PCT/CN2014/087555, filed on Sep. 26, 2014, which is hereby incorporated by reference in their entireties.

TECHNICAL FIELD

The present invention relates to telecommunications technologies, and in particular, to a method and an apparatus for controlling an application program, and an electronic device.

BACKGROUND

Generally, an electronic device such as a mobile phone or a PDA (Personal Digital Assistant) can be connected to an external audio device such as a headset or a sound box. By means of a connection to a headset, an audio output channel can be switched from a speaker or an earpiece that is disposed on a main body of an electronic device to the headset, so as to facilitate usage by a user.

In the past, when audio is played by using a headset, if an application program associated with the audio may require to be controlled (for example, the application program is started, paused, or converted), a user may require to manually operate an electronic device or a headset connected to the electronic device. For example, in cases such as getting on a vehicle or crossing a road, a user may need to take off, from the head, a headset that is outputting audio. However, in this case, an application program associated with the audio does not automatically stop running, and the user may require to manually operate an electronic device so that the application program can be stopped and playback of the audio can be stopped. For another example, when a mobile phone is connected to a Bluetooth headset, to switch an audio output channel of an incoming call to an earpiece of the mobile phone, a user may require to perform manual switch by operating the Bluetooth headset.

In a state in which an electronic device is connected to a headset, control of an application program associated with audio depends on a manual operation of a user and cannot be automatically performed. The control of the application program is complex, and is not easy for the user to operate.

SUMMARY

Embodiments of the present invention provide a method and an apparatus for controlling an application program, and an electronic device, so that a manner used by the electronic device to control, in a state in which the electronic device is connected to a headset, an audio and video application program can be simpler, and a user operates easily.

To achieve the foregoing objective, the following technical solutions are used in the embodiments of the present invention.

According to a first aspect, a method for controlling an application program is provided, where the method is applied to an electronic device connected to an external audio device, and a sensor is disposed on at least one of the electronic device or the external audio device, where when a sensor is disposed on the electronic device, the sensor disposed on the electronic device is configured to detect that a user moves the electronic device close to and/or away from the head of the user, and when a sensor is disposed on the external audio device, the sensor disposed on the external audio device is configured to detect that the user wears and/or takes off the external audio device. The method includes receiving, by the electronic device, a detection result signal sent by the sensor that is disposed on at least one of the electronic device or the external audio device, where the detection result signal carries a detection value obtained by means of detection by the sensor. The method also includes determining, by the electronic device according to a preset correspondence between a user action and a detection value and according to the detection value carried in the detection result signal, an action performed by the user on the electronic device or the external audio device, where the action performed by the user on the electronic device includes that the user moves the electronic device close to or away from the head of the user, and the action performed by the user on the external audio device includes that the user wears or takes off the external audio device. Additionally, the method includes controlling, by the electronic device, an execution status of an audio and video application program according to the action performed by the user on the electronic device or the external audio device.

With reference to the first aspect, in a first possible implementation manner of the first aspect, a sensor is disposed on the external audio device; the external audio device is a headset; and the controlling, by the electronic device, an execution status of an audio and video application program according to the action performed by the user on the external audio device specifically includes: determining, by the electronic device, a current execution status of the audio and video application program, where the execution status includes not started, running, and paused; and when the action performed by the user on the headset is taking off the headset and the execution status is running, controlling, by the electronic device, the audio and video application program to be paused; or when the action performed by the user on the headset is taking off the headset and the execution status is not started or is paused, controlling, by the electronic device, the audio and video application program to remain not started or remain paused; or when the action performed by the user on the headset is wearing the headset and the execution status is not started or is paused, controlling, by the electronic device, the audio and video application program to start to run or continue running; or when the action performed by the user on the headset is wearing the headset and the execution status is running, controlling, by the electronic device, the audio and video application program to remain running.

With reference to the first aspect or the first possible implementation manner of the first aspect, in a second possible implementation manner of the first aspect, in a case in which there are multiple audio and video application programs, before the controlling, by the electronic device, an execution status of an audio and video application program according to the action performed by the user on the electronic device or the external audio device, the method further includes: determining, by the electronic device, that an audio and video application program having a highest priority is an audio and video application program that may require to be controlled according to the action performed by the user on the electronic device or the external audio device.

With reference to the first aspect, in a third possible implementation manner of the first aspect, a sensor is disposed on the electronic device, the audio and video application program is a call application, and the controlling, by the electronic device, an execution status of an audio and video application program according to the action performed by the user on the electronic device specifically includes: when the electronic device receives an incoming call and the action performed by the user on the electronic device is moving the electronic device close to the head of the user, automatically answering, by the electronic device, the call, and controlling call audio to be output from a built-in earpiece of the electronic device; or when the electronic device is in a call and the action performed by the user on the electronic device is moving the electronic device close to the head of the user, controlling, by the electronic device, call audio to be output from a built-in earpiece of the electronic device; or when the electronic device is in a call and the action performed by the user on the electronic device is moving the electronic device away from the head of the user, controlling, by the electronic device, call audio to be output from the external audio device.

With reference to the third possible implementation manner of the first aspect, in a fourth possible implementation manner, when the electronic device receives an incoming call and the action performed by the user on the electronic device is moving the electronic device close to the head of the user, the automatically answering, by the electronic device, the call, and controlling call audio to be output from a built-in earpiece of the electronic device specifically includes: when the electronic device receives the incoming call and the action performed by the user on the electronic device is moving the electronic device close to the head of the user, determining, by the electronic device, whether a gesture answer function has been activated for the electronic device, where the gesture answer function refers to a function for the electronic device to identify a user gesture and respond to the identified user gesture to automatically answer the call; and when the gesture answer function has been activated for the electronic device, automatically answering, by the electronic device, the call, and controlling the call audio to be output from the built-in earpiece of the electronic device.

With reference to the third or the fourth possible implementation manner of the first aspect, in a fifth possible implementation manner, the automatically answering, by the electronic device, the call, and controlling the call audio to be output from the built-in earpiece of the electronic device specifically includes: determining, by the electronic device, whether an intelligent call switching function has been activated for the electronic device, where the intelligent call switching function refers to a function for the electronic device to automatically respond to the action performed by the user on the electronic device to automatically switch a call audio output channel; and when the intelligent call switching function has been activated for the electronic device, automatically answering, by the electronic device, the call, and controlling the call audio to be output from the built-in earpiece of the electronic device.

With reference to the fifth possible implementation manner of the first aspect, in a sixth possible implementation manner of the first aspect, when the intelligent call switching function is not activated for the electronic device, the method further includes: automatically answering, by the electronic device, the call, and controlling the call audio to be output from the external audio device.

With reference to the first aspect or the first to the sixth possible implementation manners of the first aspect, in a seventh possible implementation manner of the first aspect, the sensor includes at least one of an optical proximity sensor, a light sensor, or a temperature sensor.

According to a second aspect, an apparatus for controlling an application program is provided, where the apparatus is applied to an electronic device connected to an external audio device, and a sensor is disposed on at least one of the electronic device or the external audio device, where when a sensor is disposed on the electronic device, the sensor disposed on the electronic device is configured to detect that a user moves the electronic device close to and/or away from the head of the user, and when a sensor is disposed on the external audio device, the sensor disposed on the external audio device is configured to detect that the user wears and/or takes off the external audio device. The apparatus includes a receiving unit, configured to receive a detection result signal sent by the sensor that is disposed on at least one of the electronic device or the external audio device, where the detection result signal carries a detection value obtained by means of detection by the sensor. The apparatus also includes a determining unit, configured to determine, according to a preset correspondence between a user action and a detection value and according to the detection value carried in the detection result signal, an action performed by the user on the electronic device or the external audio device, where the action performed by the user on the electronic device includes that the user moves the electronic device close to or away from the head of the user, and the action performed by the user on the external audio device includes that the user wears or takes off the external audio device. Additionally, the apparatus includes a control unit, configured to control an execution status of an audio and video application program according to the action performed by the user on the electronic device or the external audio device.

With reference to the second aspect, in a first possible implementation manner of the second aspect, a sensor is disposed on the external audio device; the external audio device is a headset; and the control unit specifically includes: an execution status determining module, configured to determine a current execution status of the audio and video application program, where the execution status includes not started, running, and paused; and an execution status control module, configured to: when the action performed by the user on the headset is taking off the headset and the execution status determining module determines that the execution status is running, control the audio and video application program to be paused; or when the action performed by the user on the headset is taking off the headset and the execution status determining module determines that the execution status is not started or is paused, control the audio and video application program to remain not started or remain paused; or when the action performed by the user on the headset is wearing the headset and the execution status determining module determines that the execution status is not started or is paused, control the audio and video application program to start to run or continue running; or when the action performed by the user on the headset is wearing the headset and the execution status determining module determines that the execution status is running, control the audio and video application program to remain running.

With reference to the second aspect or the first possible implementation manner of the second aspect, in a second possible implementation manner of the second aspect, the control unit is further configured to: in a case in which there are multiple audio and video application programs, determine that an audio and video application program having a highest priority is an audio and video application program that may require to be controlled by the control unit according to the action performed by the user on the electronic device or the external audio device.

With reference to the second aspect, in a third possible implementation manner of the second aspect, a sensor is disposed on the electronic device, the audio and video application program is a call application, and the control unit is specifically configured to: when the electronic device receives an incoming call and the action performed by the user on the electronic device is moving the electronic device close to the head of the user, control the electronic device to automatically answer the call, and control call audio to be output from a built-in earpiece of the electronic device; or when the electronic device is in a call and the action performed by the user on the electronic device is moving the electronic device close to the head of the user, control call audio to be output from a built-in earpiece of the electronic device; or when the electronic device is in a call and the action performed by the user on the electronic device is moving the electronic device away from the head of the user, control call audio to be output from the external audio device.

With reference to the third possible implementation manner of the second aspect, in a fourth possible implementation manner of the second aspect, the control unit is specifically configured to: when the electronic device receives an incoming call and the action performed by the user on the electronic device is moving the electronic device close to the head of the user, determine whether a gesture answer function has been activated for the electronic device, where the gesture answer function refers to a function for the electronic device to identify a user gesture and respond to the identified user gesture to automatically answer the call; and when the gesture answer function has been activated for the electronic device, control the electronic device to automatically answer the call, and control the call audio to be output from the built-in earpiece of the electronic device.

With reference to the third or the fourth possible implementation manner of the second aspect, in a fifth possible implementation manner of the second aspect, the control unit is specifically configured to: determine whether an intelligent call switching function has been activated for the electronic device, where the intelligent call switching function refers to a function for the electronic device to automatically respond to the action performed by the user on the electronic device to automatically switch a call audio output channel; and when the intelligent call switching function has been activated for the electronic device, control the electronic device to automatically answer the call, and control the call audio to be output from the built-in earpiece of the electronic device.

With reference to the fifth possible implementation manner of the second aspect, in a sixth possible implementation manner of the second aspect, the control unit is further configured to: when the intelligent call switching function is not activated for the electronic device, control the electronic device to automatically answer the call, and control the call audio to be output from the external audio device.

According to a third aspect, an electronic device is provided, where the electronic device is connected to an external audio device, a sensor is disposed on at least one of the electronic device or the external audio device, where when a sensor is disposed on the electronic device, the sensor disposed on the electronic device is configured to detect that a user moves the electronic device close to and/or away from the head of the user, and when a sensor is disposed on the external audio device, the sensor disposed on the external audio device is configured to detect that the user wears and/or takes off the external audio device; and the electronic device includes: a receiver, configured to receive a detection result signal sent by the sensor that is disposed on at least one of the electronic device or the external audio device, where the detection result signal carries a detection value obtained by means of detection by the sensor; and a processor, configured to determine, according to a preset correspondence between a user action and a detection value and according to the detection value carried in the detection result signal, an action performed by the user on the electronic device or the external audio device, where the action performed by the user on the electronic device includes that the user moves the electronic device close to or away from the head of the user, and the action performed by the user on the external audio device includes that the user wears or takes off the external audio device, where the processor is further configured to control an execution status of an audio and video application program according to the action performed by the user on the electronic device or the external audio device.

With reference to the third aspect, in a first possible implementation manner of the third aspect, a sensor is disposed on the external audio device; the external audio device is a headset; and the processor is specifically configured to: determine a current execution status of the audio and video application program, where the execution status includes not started, running, and paused; and when the action performed by the user on the headset is taking off the headset and the execution status is running, control the audio and video application program to be paused; or when the action performed by the user on the headset is taking off the headset and the execution status is not started or is paused, control the audio and video application program to remain not started or remain paused; or when the action performed by the user on the headset is wearing the headset and the execution status is not started or is paused, control the audio and video application program to start to run or continue running; or when the action performed by the user on the headset is wearing the headset and the execution status is running, control the audio and video application program to remain running.

With reference to the third aspect or the first possible implementation manner of the third aspect, in a second possible implementation manner of the third aspect, the processor is further configured to: in a case in which there are multiple audio and video application programs, determine that an audio and video application program having a highest priority is an audio and video application program that may require to be controlled by the processor according to the action performed by the user on the electronic device or the external audio device.

With reference to the third aspect, in a third possible implementation manner of the third aspect, a sensor is disposed on the electronic device, the audio and video application program is a call application, and the processor is specifically configured to: when the electronic device receives an incoming call and the action performed by the user on the electronic device is moving the electronic device close to the head of the user, control the electronic device to automatically answer the call, and control call audio to be output from a built-in earpiece of the electronic device; or when the electronic device is in a call and the action performed by the user on the electronic device is moving the electronic device close to the head of the user, control call audio to be output from a built-in earpiece of the electronic device; or when the electronic device is in a call and the action performed by the user on the electronic device is moving the electronic device away from the head of the user, control call audio to be output from the external audio device.

With reference to the third possible implementation manner of the third aspect, in a fourth possible implementation manner of the third aspect, the processor is specifically configured to: when the electronic device receives an incoming call and the action performed by the user on the electronic device is moving the electronic device close to the head of the user, determine whether a gesture answer function has been activated for the electronic device, where the gesture answer function refers to a function for the electronic device to identify a user gesture and respond to the identified user gesture to automatically answer the call; and when the gesture answer function has been activated for the electronic device, control the electronic device to automatically answer the call, and control the call audio to be output from the built-in earpiece of the electronic device.

With reference to the third or the fourth possible implementation manner of the third aspect, in a fifth possible implementation manner of the third aspect, the processor is specifically configured to determine whether an intelligent call switching function has been activated for the electronic device, where the intelligent call switching function refers to a function for the electronic device to automatically respond to the action performed by the user on the electronic device to automatically switch a call audio output channel; and when the intelligent call switching function has been activated for the electronic device, control the electronic device to automatically answer the call, and control the call audio to be output from the built-in earpiece of the electronic device.

With reference to the fifth possible implementation manner of the third aspect, in a sixth possible implementation manner of the third aspect, the processor is further configured to determine whether an intelligent call switching function has been activated for the electronic device, where the intelligent call switching function refers to a function for the electronic device to automatically respond to the action performed by the user on the electronic device to automatically switch a call audio output channel; and when the intelligent call switching function is not activated for the electronic device, control the electronic device to automatically answer the call, and control the call audio to be output from the external audio device.

According to a method and an apparatus for controlling an application program, and an electronic device that are provided in the embodiments of the present invention, in a state in which the electronic device is connected to an external audio device, the electronic device can determine, according to a detection value acquired by a sensor disposed on at least one of the electronic device or the external audio device and a preset correspondence between a user action and a detection value, an action performed by a user on the electronic device or the external audio device, and control an execution status of an audio and video application program according to the action. The action performed by the user on the electronic device or the external audio device implies a corresponding user requirement, and a mechanism provided by the present invention to the electronic device can determine the user action and control the audio and video application program according to the user action, that is, explore the corresponding user requirement that is implied by the user action, and perform a corresponding control action to satisfy the user requirement, which therefore can make a manner used by the electronic device to control, in the state in which the electronic device is connected to the external audio device, the audio and video application program simpler, so that the user operates easily.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention.

FIG. 1 is a schematic diagram of a headset according to an embodiment of the present invention;

FIG. 2 is a flowchart of a method for controlling an application program according to Embodiment 1;

FIG. 4 is a flowchart showing that an electronic device controls an audio and video application program according to Embodiment 3;

DETAILED DESCRIPTION OF ILLUSTRATIVE EMBODIMENTS

Figure 3:
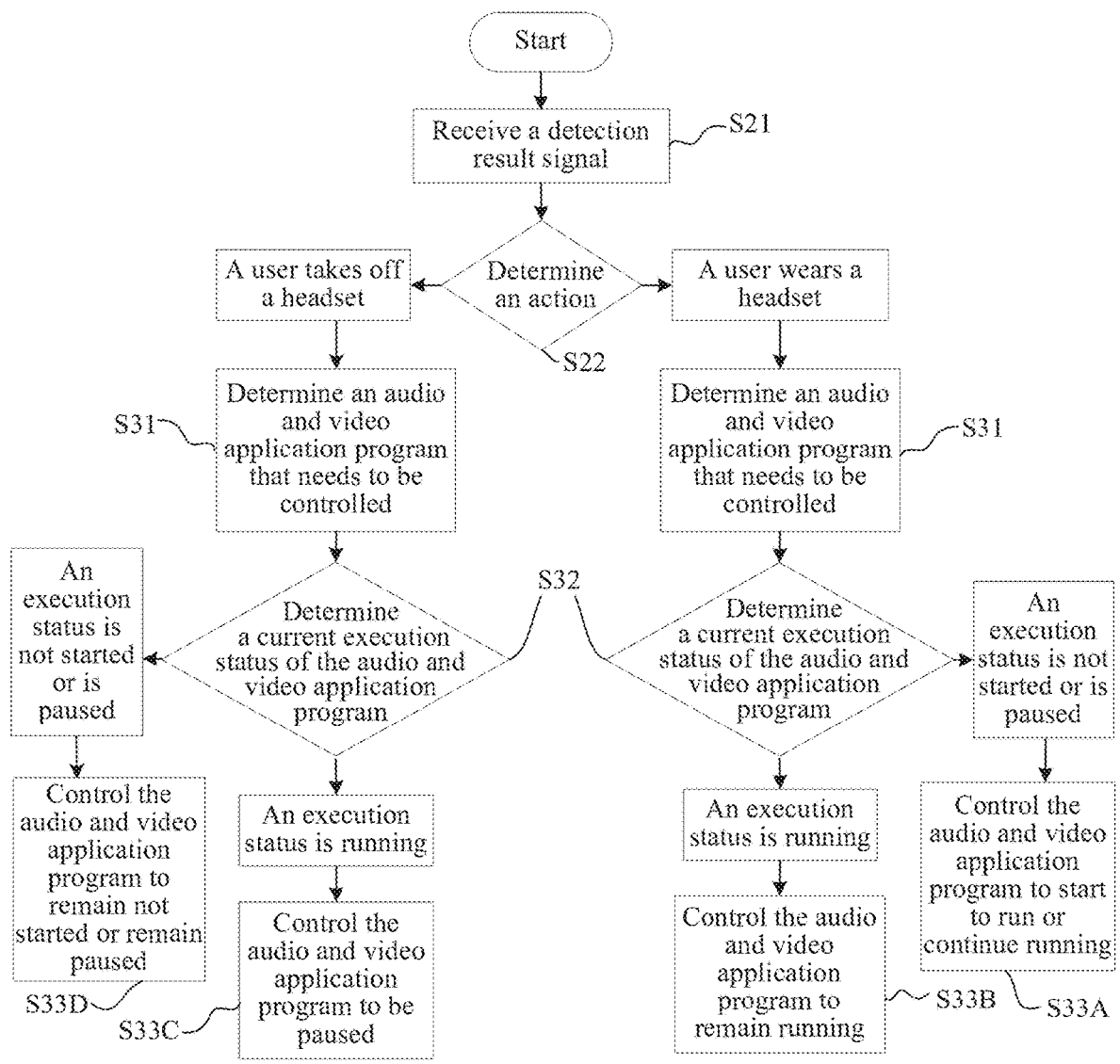
FIG. 3 is a flowchart showing that an electronic device controls an audio and video application program according to Embodiment 2.

The following clearly and completely describes the technical solutions in the embodiments of the present invention with reference to the accompanying drawings in the embodiments of the present invention. Apparently, the described embodiments are merely some but not all of the embodiments of the present invention.

At first, an audio device involved in the embodiments of the present invention is described. The audio device involved in the present invention refers to a device having an audio playback function. Audio devices are classified into external audio devices and built-in audio devices according to whether the audio devices are pluggable relative to an electronic device. The electronic device may be any mobile or portable electronic device, including but not limited to a mobile phone, a mobile computer, a tablet computer, and a Personal Digital Assistant (PDA). An external audio device may be connected to the electronic device in a wired or wireless manner for use. When not used, the external audio device may be physically disconnected from the electronic device. Such an external audio device may be, for example, a wired headset, a Bluetooth headset, or a sound box. A built-in audio device is disposed inside the electronic device, for example, a built-in microphone of a mobile phone, or a speaker built in a tablet computer.

In the embodiments of the present invention, a sensor is disposed on at least one of the electronic device or the external audio device.

For example, when the external audio device is a headset, the headset may be any wired or wireless headset, for example, a sound source line headset, an infrared headset, or a Bluetooth headset. According to shapes, the headset may be a headset in any shape, for example, in-ear, headphone, or ear-bud. As shown in FIG. 1, in addition to having a speaker of an ordinary headset, that is, having an audio playback function, the headset involved in the embodiments of the present invention may further be provided with a sensor, where the sensor is configured to detect a usage state of the headset, and in particular, is configured to perform detection when a user wears and takes off the headset. A type of the sensor that is disposed on the headset includes but is not limited to an optical proximity sensor, a light sensor, and a temperature sensor. In the embodiments of the present invention, any type of sensor described above may be disposed in the headset, or any combination of multiple types of sensors may be disposed in the headset.

A basic working principle of an optical proximity sensor is that, light emitted by the optical proximity sensor is reflected by a baffle object (such as a human face) that has a particular distance ahead of the optical proximity sensor, and is then received by the optical proximity sensor. The optical proximity sensor determines an amount of light loss according to the received light, and determines the distance between the baffle object and the optical proximity sensor according to the amount of light loss. The light sensor can convert received light intensity into an electrical signal. The temperature sensor can convert a detected temperature into an electrical signal. As shown in FIG. 1, in the embodiments of the present invention, preferably, a sensor is disposed on the front of the headset, that is, on a housing on a face side of the speaker of the headset. In addition, for the optical proximity sensor or the light sensor, a side for emitting/receiving light and the face side of the speaker face toward a same direction. For the temperature sensor, more preferably, the temperature sensor is disposed at a position on the housing of the headset, where at the position, the temperature sensor can be directly in contact with the body of the user (when the user wears the headset), and a finger of the user does not easily touch (for example, is not touched when the user adjusts a position of the headset) the position. By means of such disposing, for the optical proximity sensor, when the user wears the headset, the optical proximity sensor can obviously detect that an amount of light loss increases; and when the user takes off the headset, the optical proximity sensor can obviously detect that an amount of light loss decreases. For the light sensor, when the user wears the headset, the light sensor can obviously detect that an amount of light loss decreases; and when the user takes off the headset, the light sensor can obviously detect that an amount of light loss increases. For the temperature sensor, when the user wears the headset, the temperature sensor can obviously detect that temperature increases; and when the user takes off the headset, the temperature sensor can obviously detect that temperature decreases. Comparatively, if the sensor is disposed at another position, for example, the back or a side of the headset, a finger, instead of the body, of the user mainly affects a detection value; therefore it is difficult to distinguish a detection value corresponding to when the user wears or takes off the headset.

For the electronic device, a sensor may also be disposed on a side of a screen of the electronic device. The disposed sensor includes but is not limited to one of or any combination of the foregoing three types of sensors. However, the optical proximity sensor is preferred, and may be disposed in an existing disposing manner. The sensor that is disposed on the screen of the electronic device can detect an action of the user when the user moves the electronic device close to or away from the head of the user.

Embodiment 1

This embodiment is used to describe a method for controlling an application program provided in the present invention. The method is applied to an electronic device connected to an external audio device. The electronic device is connected to the external audio device in a wired or wireless manner. As described above, a sensor is disposed on at least one of the electronic device or the external audio device. FIG. 2 is a flowchart of a method for controlling an application program according to Embodiment 1. As shown in FIG. 2, the method includes the following steps.

S21: The electronic device receives a detection result signal sent by the sensor that is disposed on at least one of the electronic device or the external audio device, where the detection result signal carries a detection value obtained by means of detection by the sensor.

In this step, the detection result signal received by the electronic device is from the sensor disposed on the external audio device, or is from the sensor disposed on the electronic device. Alternatively, the electronic device receives both a detection result signal that is from the sensor disposed on the external audio device and a detection result signal that is from the sensor disposed on the electronic device.

First, that the detection result signal is from the sensor disposed on the external audio device is described. After the external audio device is connected to the electronic device, the electronic device supplies power to the sensor in the external audio device, and a detection function is activated for the sensor. The sensor can maintain real-time monitoring. The sensor acquires a detection value in real time. When a user wears or takes off the external audio device, the detection value changes suddenly. For example, an amount of light loss that is detected by the optical proximity sensor increases or decreases obviously, where the detection value not only indicates a light intensity value, a temperature value, or another value, but also indicates a value of an electrical signal that is converted from a light intensity signal, a temperature signal, or another signal, which are not differentiated in the present invention. The detection value obtained by means of detection by the sensor is carried in the detection result signal, and is sent to the electronic device by using a connection between the external audio device and the electronic device. In this way, the electronic device can acquire the detection value obtained by means of detection by the sensor.

Next, that the detection result signal is from the sensor disposed on the electronic device is described. In a case of an incoming call, or during a call, or in another case, the detection function is activated for the sensor that is disposed on the electronic device, and the sensor detects that the user moves the electronic device close to or away from the head. For example, when the user moves the electronic device close to or away from the head, the detection value changes suddenly. For example, the amount of light loss that is detected by the optical proximity sensor increases or decreases obviously. Similarly, the detection value may be carried in the detection result signal, and sent to the electronic device by using a connection between the sensor and the electronic device.

S22: The electronic device determines, according to a preset correspondence between a user action and a detection value and according to the detection value carried in the detection result signal, an action performed by the user on the electronic device or the external audio device.

In this embodiment, the electronic device may pre-store the preset correspondence that is used to determine the action performed by the user on the electronic device or the external audio device. The preset correspondence refers to a correspondence, between the detection value and the action performed by the user on the electronic device or the external audio device, and specifically may be preset by referring to a position at which the sensor is disposed. For example, when a sensor is disposed on the electronic device, because an action performed by a user on the electronic device may be required to be determined according to a detection value acquired by the sensor, a correspondence, between the detection value and the action performed by the user on the electronic device may require. When a sensor is disposed on the external audio device, because an action performed by a user on the external audio device may require to be determined according to a detection value acquired by the sensor, a correspondence, between the detection value and the action performed by the user on the external audio device may require. When a sensor is disposed on each of the electronic device and the external audio device, a correspondence, between a detection value and an action performed by a user on the electronic device, that is used to determine the action performed by the user on the electronic device, and a correspondence, between a detection value and an action performed by a user on the external audio device, that is used to determine the action performed by the user on the external audio device may be preset. The foregoing action performed by the user on the electronic device includes at least that the user moves the electronic device close to or away from the head of the user. The action performed by the user on the external audio device includes at least that the user wears or takes off the external audio device. Certainly, subject to that the action can be detected by the sensor, the action may further include holding the external audio device, adjusting only a position of the external audio device, or the like.

The preset correspondence may be more specifically a correspondence between a user action and a range of a detection value, for example, a preset range for determining whether the user moves the electronic device close to or away from the head of the user, or a preset range for determining whether the user wears or takes off the headset. The following provides descriptions by using an example of how to determine, according to a preset range, whether the user wears or takes off the headset. How to determine, according to a preset range, whether the user moves the electronic device close to or away from the head of the user may be known by referring to the example. For example, according to an experimental statistics result, a first preset range may be set, where the range represents that the user wears the headset; and a second preset range may be set, where the range represents that the user takes off the headset. Specifically, after receiving a detection result signal sent by the headset, the electronic device reads a detection value carried in the detection result signal, and compares the detection value with the first preset range or the second preset range. If the detection value falls within the first preset range, the electronic device determines that an action is that the user wears the headset. If the detection value falls within the second preset range, the electronic device determines that an action is that the user takes off the headset.

For example, whether a user performs an action of wearing or taking off a headset is determined by using a detection value acquired by any sensor of an optical proximity sensor, a light sensor, or a temperature sensor, or by referring to detection values acquired by any two sensors of the three, or by referring to detection values acquired by all the three sensors. An amount of light loss acquired by the optical proximity sensor may be compared with a preset range. If the amount of light loss is within the first preset range, it is determined that the headset is covered by an object, and it is determined that the action is that the user wears the headset. If the amount of light loss is within the second preset range, it is determined that the headset is not covered by any object, and it is determined that the action is that the user takes off the headset. A light intensity value or a temperature value acquired by using the light sensor or the temperature sensor may also be determined in a similar manner.

S23: The electronic device controls an execution status of an audio and video application program according to the action performed by the user on the electronic device or the external audio device.

In this step, the electronic device may control the application program according to the action determined in S22. In the present invention, how to control an application program in a state in which an electronic device is connected to an external audio device is considered, and the external audio device plays audio. Therefore, the controlled application program is an audio and video application program, where the audio and video application program refers to an application program that can display audio/video content to a user when the application program is running. The audio and video application program may be specifically a music player, a video player, a game, a call application, or the like. An execution status of the audio and video application program includes but is not limited to started, stopped, paused, and audio output channel switching. The execution status is related to a specific audio and video application program. For example, for the call application, an execution status of the call application includes at least connected, disconnected, a voice being output from a built-in microphone, or a voice being output from an external audio device. The controlled audio and video application program may be an audio and video application program that is currently running, where the currently running includes that the audio and video application program is running in the foreground in the electronic device or the audio and video application program is running in the background; or the audio and video application program that is currently running may be an audio and video application program that is currently not started. Specifically, content of the audio and video application program may be a paused state, or may be a playback state.

There are multiple manners in which the electronic device controls an execution status of an audio and video application program according to the action performed by the user on the electronic device or the external audio device. For the action performed by the user on the electronic device, for example, if the action is that the user moves the electronic device close to the head, the electronic device may control an audio output channel of the audio and video application program to switch to an earpiece of the electronic device; if the action is that the user moves the electronic device away from the head, the electronic device may control an audio output channel of the audio and video application program to switch to the external audio device. For the action performed by the user on the external audio device, for example, if the action is that the user wears the headset, the electronic device may control the audio and video application program to start to run or continue running; if the action is that the user takes off the headset, the electronic device may control the audio and video application program to be paused.

According to the method for controlling an application program that is provided in Embodiment 1, in a state in which the electronic device is connected to an external audio device, the electronic device can determine, according to a detection value acquired by a sensor disposed on at least one of the electronic device or the external audio device and a preset correspondence between a user action and a detection value, an action performed by a user on the electronic device or the external audio device, and control an execution status of an audio and video application program according to the action. The action performed by the user on the electronic device or the external audio device implies a corresponding user requirement, and a mechanism provided by this embodiment to the electronic device can determine the user action and control the audio and video application program according to the user action, that is, explore the corresponding user requirement that is implied by the user action, and perform a corresponding control action to satisfy the user requirement, which therefore can make a manner used by the electronic device to control, in the state in which the electronic device is connected to the external audio device, the audio and video application program simpler, so that the user operates easily, and higher intelligentization is achieved.

Detection objects of the sensor disposed on the electronic device and the sensor disposed on the external audio device are different, actions determined according to detection values are different, and control over an execution status of an audio and video application program according to the actions is also different. The following separately provides descriptions in Embodiment 2 and Embodiment 3.

Embodiment 2

Embodiment 2 is used to describe how an electronic device controls an audio and video application program according to an action performed by a user on an external audio device. As shown in FIG. 3, the process specifically includes.

S31: Determine an audio and video application program that may require to be controlled.

When control over an execution status of an audio and video application program is triggered, in a case in which there are multiple audio and video application programs, the electronic device may determine that an audio and video application program having a highest priority is an audio and video application program that may require to be controlled, where a priority is specifically described below.

S32: An electronic device determines a current execution status of the audio and video application program.

Generally, a user is accustomed to directly operating the electronic device to control a status of the audio and video application program. For example, in a state of wearing a headset, a user may manually pause a music player, and if subsequently that the user takes off the headset is detected by a sensor, if switching the execution status of the audio and video application program is triggered immediately after the user action of taking off or wearing the headset is detected, the electronic device may automatically switch the paused music player to continuing to play, that is, an improper operation is caused. To prevent the improper operation, the execution status of the audio and video application program may be determined before the execution status of the audio and video application program is controlled according to the action performed by the user on the external audio device, so that an adaptive operation can be performed according to the execution status. The execution status includes not started, running, paused, or the like.

After the current execution status of the audio and video application program is determined, the execution status of the audio and video application program is controlled according to the action that is performed by the user on the external audio device and that is determined in S22 in Embodiment 1. A specific control manner includes S33A to S33D.

S33A: When an action is that a user wears a headset and the execution status is not started or is paused, the electronic device controls the audio and video application program to start to run or continue running.

S33B: When an action is that a user wears a headset and the execution status is running, the electronic device controls the audio and video application program to remain running.

S33C: When an action is that a user takes off a headset and the execution status is running, the electronic device controls the audio and video application program to be paused.

S33D: When an action is that a user takes off a headset and the execution status is not started or is paused, the electronic device controls the audio and video application program to remain not started or remain paused.

For example, if the action is that the user wears the headset, and in this case, an audio and video application program such as music, a video, or a game already runs in the electronic device, and is in a running state, the electronic device controls the audio and video application program to continue running. If the action is that the user takes off the headset, and in this case, an audio and video application program such as music, a video, or a game already runs in the electronic device, and is in a paused state, the electronic device automatically switches the audio and video application program to a running state.

When a control manner for controlling an execution status of an audio and video application program according to a user action is set, a logical order of a current execution status and a control manner is considered, a control manner that does not comply with the logical order is avoided. For example, if a current execution status is not started, a control manner that may be selected is starting or remaining not started, and when the user action is wearing the headset, a corresponding audio and video application program is controlled to be started but not to continue running (in respect of software, an implementation manner for controlling the application program to be started is different from an implementation manner for controlling the application program to continue running).

The electronic device not only may control one type of audio and video application program, but also may control multiple types of audio and video application programs at the same time. For example, if the action is that the user takes off the headset, and the electronic device is in a call, a mobile phone controls the call to automatically switch to an earpiece of the mobile phone. In this case, the electronic device not only controls the headset to be turned off, but also controls the earpiece of the mobile phone to be started.

The following describes how to determine, based on a priority, an audio and video application program that may require to be controlled according to an action performed by a user on an external audio device, which is mentioned in S31. It may be understood that, how to determine an audio and video application program that may require to be controlled according to an action performed by a user on an electronic device is similar.

In a task management module of the electronic device, information from a time at which an event occurs to a time at which the event ends is recorded, where the information specifically includes times at which application programs start to run, are paused, are stopped, and the like. The electronic device may set, as a condition having a highest priority, that an event occurs and a time at which the event occurs is the closest to the present, and determines that an audio and video application program that satisfies the condition is an audio and video application program that may require to be controlled. For example, a music player that is currently running has a highest priority because an occurrence time for the music player is the present. If a user turns off the music player and then opens an image browser, although a time at which an event of opening the image browser occurs is the closest to the present, the image browser is not associated with audio and is not an audio and video application program; therefore, the electronic device determines that the music player but not the image browser is an audio and video application program that may require to be controlled.

Alternatively, a user may preset a priority of an audio and video application program. For example, a user may set a music player as an audio and video application program having a highest priority, and when an action is that the user wears a headset and an execution status of the music player is not started or is paused, the electronic device directly makes the music player start to run or continue running, and does not control another audio and video application program, for example, a video player in a paused state.

By means of setting a priority, a conflict caused by existence of multiple audio and video application programs when execution statuses of the audio and video application programs are controlled can be prevented. In addition, user experience can be improved because a set priority order complies with a usage habit of a user.

Embodiment 3

Embodiment 3 is used to describe how an electronic device controls an audio and video application program according to an action performed by a user on the electronic device, where as an example, the audio and video application program is a call application. In this embodiment, the electronic device may be any mobile terminal having a call function, for example, a mobile phone. A sensor is disposed on the mobile phone, and an external audio device is connected to the mobile phone in a wireless manner, where the external audio device may be specifically a Bluetooth headset or a Bluetooth sound box. As shown in FIG. 4, the method specifically includes.

S41: The mobile phone receives a detection result signal sent by the sensor on the mobile phone, where the detection result signal carries a detection value that is obtained by means of detection by the sensor.

S42: The mobile phone determines, according to a preset range and the detection value that is carried in the detection result signal, an action performed by a user on the mobile phone.

After determining the action performed by the user on the mobile phone, the mobile phone may control a call application with reference to an execution status of the call application. A specific control manner includes S43A to S43C.

S43A: When the mobile phone receives an incoming call and the action performed by the user on the mobile phone is moving the mobile phone close to a user head, the mobile phone automatically answers the call and controls call audio to be output from a built-in earpiece of the mobile phone.

S43B: When the mobile phone is in a call and the action performed by the user on the mobile phone is moving the mobile phone close to a user head, the mobile phone controls call audio to be output from a built-in earpiece of the mobile phone.

S43C: When the mobile phone is in a call and the action performed by the user on the mobile phone is moving the mobile phone away from a user head, the mobile phone controls call audio to be output from the external audio device.

In the prior art, in a state in which the mobile phone is connected to a Bluetooth device such as a Bluetooth headset or a Bluetooth sound box, if there is an incoming call in this case, the user operates the mobile phone to answer the call, and the call is output from the Bluetooth headset or the Bluetooth sound box. If in this case the user does not know that the mobile phone is connected to the Bluetooth headset, and cannot find the Bluetooth headset for the moment, the user further may require to manually operate the mobile phone to switch a call audio output channel back to an earpiece of the mobile phone. Such an operation causes trouble to the user. Alternatively, if in this case the user does not know that the mobile phone is connected to the Bluetooth sound box, another person in a room in which the Bluetooth sound box is located can also hear dialog content, which also causes trouble to the user. However, according to the solution in Embodiment 3, even if the user does not know that the mobile phone is connected to a Bluetooth device, the mobile phone can switch the call audio output channel to the built-in earpiece of the mobile phone according to a user action of moving the mobile phone close to the head and with reference to an execution status in which the mobile phone receives an incoming call or is in a call. Therefore, trouble brought to the user due to that call audio is output from the Bluetooth device can be prevented. In addition, when the mobile phone is in a call and the user moves the mobile phone away from the head, the mobile phone can control call audio to be output from the Bluetooth device. In such a control manner, a user intention can be identified, and intelligent control can be performed, so that user experience is better.

Embodiment 4

Figure 5:
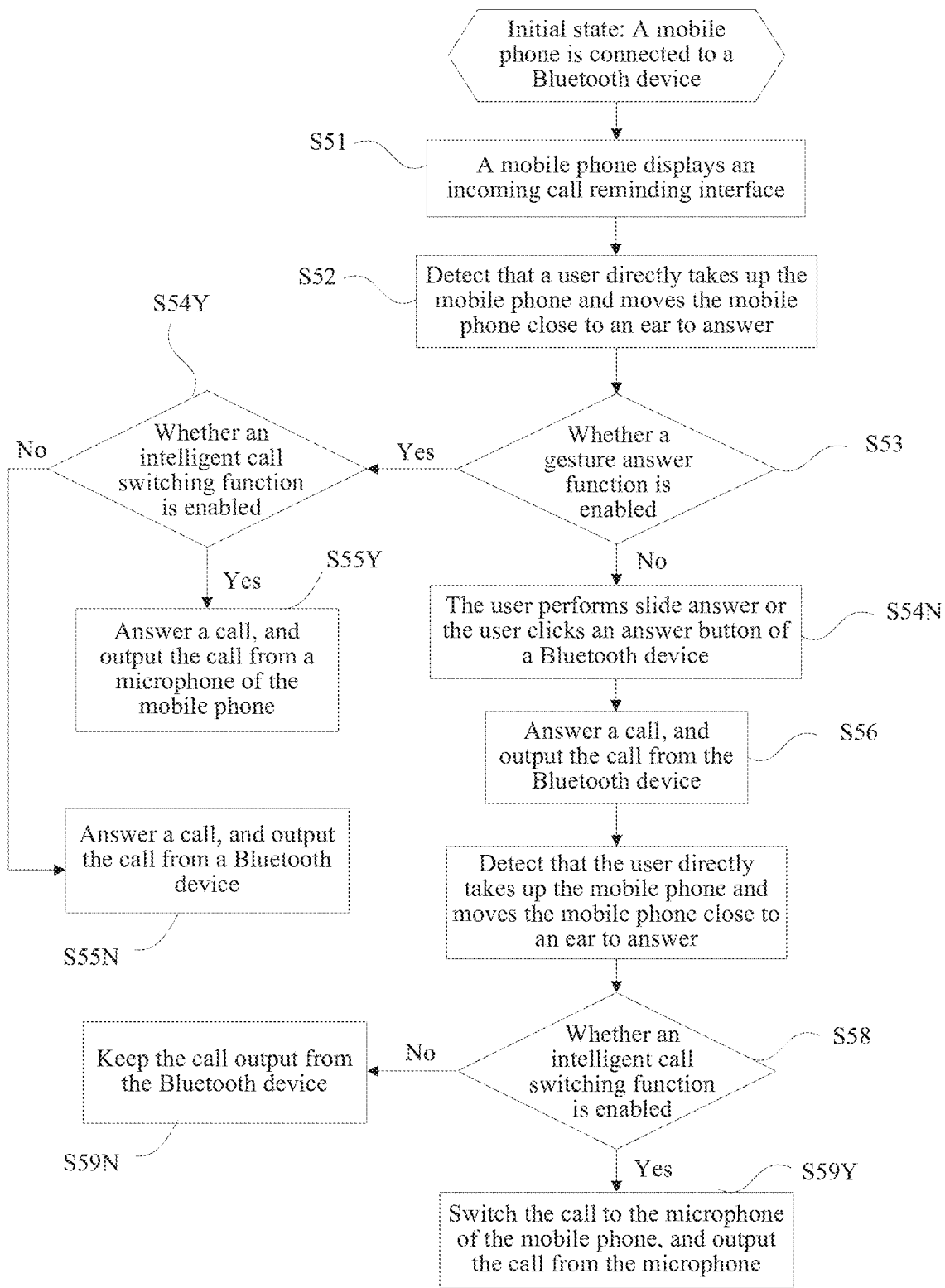
FIG. 5 is a flowchart showing that a mobile phone controls a call program according to Embodiment 4.

Embodiment 4 is used to more specifically describe, on the basis of Embodiment 3, how a mobile phone controls a call application according to an action performed by a user on the mobile phone. As shown in FIG. 5, the method includes.

An initial state: A mobile phone is connected to a Bluetooth device.

S51: A mobile phone displays an incoming call reminding interface.

S52: An optical proximity sensor that is disposed on the mobile phone detects that a user directly takes up the mobile phone and moves the mobile phone close to a head to answer.

S53: The mobile phone determines whether a gesture answer function is activated.

That is, when the mobile phone is in a call and the action performed by the user on the mobile phone is moving the mobile phone away from a user head, the mobile phone determines whether the gesture answer function has been activated for the mobile phone, where the gesture answer function refers to a function for the mobile phone to identify a user gesture and respond to the identified user gesture to automatically answer the call. A menu option may be set in the mobile phone to enable or disable the gesture answer function.

When the mobile phone determines that the gesture answer function has been activated for the mobile phone, S54Y is performed. When the mobile phone determines that the gesture answer function has not been activated for the mobile phone, S54N is performed.

S54Y: The mobile phone determines whether an intelligent call switching function is activated.

That is, the mobile phone determines whether the intelligent call switching function has been activated for the mobile phone, where the intelligent call switching function refers to a function for the mobile phone to automatically respond to the action performed by the user on the mobile phone to automatically switch a call audio output channel.

When the mobile phone determines that the intelligent call switching function has been activated for the mobile phone, S55Y is performed. When the mobile phone determines that the intelligent call switching function has not been activated for the mobile phone, S55N is performed.

S55Y: The mobile phone automatically answers a call, and controls call audio to be output from a built-in microphone of the mobile phone.

That is, when the intelligent call switching function has been activated for the mobile phone, the mobile phone automatically answers the call, and controls the call audio to be output from a built-in earpiece of the mobile phone.

In an optional embodiment of Embodiment 4, when it is determined that the gesture answer function has been activated for the mobile phone, the mobile phone may not perform S54Y to determine whether the intelligent call switching function is activated, but may directly automatically answers the call and controls the call audio to be output from the built-in earpiece of the mobile phone. A menu option may be set in the mobile phone to enable or disable the intelligent call switching function.

S55N: The mobile phone automatically answers a call, and controls call audio to be output from a Bluetooth device.

S54N: The mobile phone receives a user operation of slide answer or a user operation of clicking an answer button of a Bluetooth device.

S56: The mobile phone answers the call, and outputs the call audio from the Bluetooth device.

S57: The optical proximity sensor that is disposed on the mobile phone detects that the user directly takes up the mobile phone and moves the mobile phone close to the head to answer.

S58: The mobile phone determines whether an intelligent call switching function is activated.

S59Y: The mobile phone automatically switches the call audio to the built-in microphone of the mobile phone, and outputs the call audio from the built-in microphone.

S59N: The mobile phone controls the call audio to keep output from the Bluetooth device.

According to a procedure of the method for controlling an application program that is provided in Embodiment 4, a step of determining whether a gesture answer function is activated is added, so that a user may determine, according to a requirement of the user, whether to enable the gesture answer function, which prevents an electricity loss from being caused by keeping the gesture answer function always activated. Further, an intelligent call switching function is further added, so that the user may determine, according to a requirement of the user, whether to enable the intelligent call switching function, which prevents an electricity loss from being caused by keeping the intelligent call switching function always activated.

Embodiment 5

Corresponding to Embodiment 1, Embodiment 5 is used to describe an apparatus for controlling an application program that is provided in the present invention. The apparatus is applied to an electronic device connected to an external audio device. For example, the apparatus may be a functional module disposed in the electronic device. The external audio device is an audio device that can be connected to the electronic device in a wired or wireless manner. A sensor is disposed on at least one of the electronic device or the external audio device, where when a sensor is disposed on the electronic device, the sensor disposed on the electronic device is configured to detect that a user moves the electronic device close to and/or away from the head of the user; and when a sensor is disposed on the external audio device, the sensor disposed on the external audio device is configured to detect that the user wears and/or takes off the external audio device. The sensor includes but is not limited to an optical proximity sensor, a light sensor, and a temperature sensor.

Figure 6A:
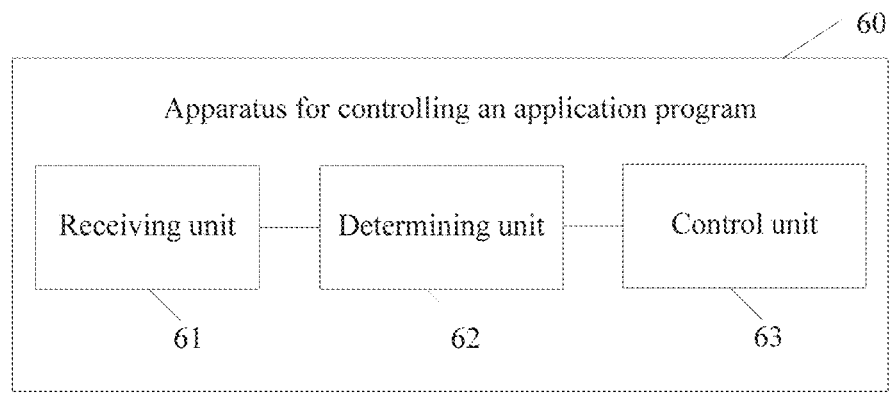
FIG. 6A is a schematic structural diagram of an apparatus for controlling an application program according to Embodiment 5.

As shown in FIG. 6A, the apparatus 60 includes: a receiving unit 61, configured to receive a detection result signal sent by the sensor that is disposed on at least one of an electronic device or the external audio device, where the detection result signal carries a detection value obtained by means of detection by the sensor; a determining unit 62, configured to determine, according to a preset correspondence between a user action and a detection value and according to the detection value carried in the detection result signal, an action performed by the user on the electronic device or the external audio device, where the action performed by the user on the electronic device includes that the user moves the electronic device close to or away from the head of the user, and the action performed by the user on the external audio device includes that the user wears or takes off the external audio device; and a control unit 63, configured to control an execution status of an audio and video application program according to the action performed by the user on the electronic device or the external audio device.

In this embodiment, the receiving unit 61 receives, from a sensor that is disposed on a headset or a main body of the electronic device, a detection value obtained by means of detection by the sensor. The determining unit 62 determines, according to the detection value and a preset range that is used to determine the action performed by the user on the electronic device or the external audio device, the action performed by the user on the electronic device or the external audio device, and controls the execution status of the audio and video application program according to the action. An implementation manner of this embodiment is similar to that of the foregoing embodiment.

For example, the electronic device is a mobile phone and the external audio device is a headset. A detection value acquired by a sensor that is disposed in the headset is transmitted to a mobile phone by using the Bluetooth or a sound source line. The apparatus 60 in the mobile phone determines and stores the foregoing detection value, and controls a particular audio and video application program according to a determining result (that is, an action). For example, the apparatus 60 may transmit a determining result to a music module, a video module, a game module, or another module, to control the module to be paused or to play. When a user wears a headset and is in a call, the apparatus 60 may transmit the determining result to a call application module. If the determining result is that the headset is taken off, the apparatus 60 controls a call to be automatically switched to a built-in earpiece of the mobile phone.

For a manner in which the apparatus 60 processes the detection value acquired by the sensor that is disposed in the main body of the electronic device, refer to the foregoing method embodiments.

According to the apparatus provided in Embodiment 5, in a state in which the electronic device is connected to an external audio device, the electronic device can determine, according to a detection value acquired by a sensor disposed on at least one of the electronic device or the external audio device and a preset correspondence between a user action and a detection value, an action performed by a user on the electronic device or the external audio device, and control an execution status of an audio and video application program according to the action. The action performed by the user on the electronic device or the external audio device implies a corresponding user requirement, and a mechanism provided by this embodiment to the electronic device can determine the user action and control the audio and video application program according to the user action, that is, explore the corresponding user requirement that is implied by the user action, and perform a corresponding control action to satisfy the user requirement, which therefore can make a manner used by the electronic device to control, in the state in which the electronic device is connected to the external audio device, the audio and video application program simpler, so that the user operates easily, and higher intelligentization is achieved.

Figure 6B:
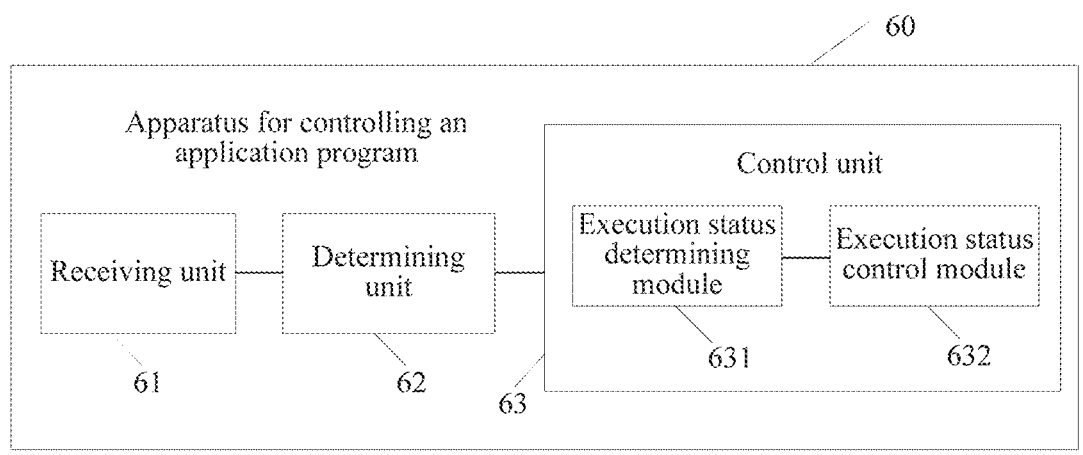
FIG. 6B is another schematic structural diagram of an apparatus for controlling an application program according to Embodiment 5.

Corresponding to the foregoing Embodiment 2, in a specific embodiment of Embodiment 5, a sensor is disposed on the external audio device, and the external audio device is specifically a headset. As shown in FIG. 6B, the control unit 63 specifically includes: an execution status determining module 631, configured to determine a current execution status of the audio and video application program, where the execution status includes not started, running, and paused; and an execution status control module 632, configured to: when the action performed by the user on the headset is taking off the headset and the execution status is running, control the audio and video application program to be paused; or when the action performed by the user on the headset is taking off the headset and the execution status is not started or is paused, control the audio and video application program to remain not started or remain paused; or when the action performed by the user on the headset is wearing the headset and the execution status is not started or is paused, control the audio and video application program to start to run or continue running; or when the action performed by the user on the headset is wearing the headset and the execution status is running, control the audio and video application program to remain running.

In addition, to prevent an error from occurring in control by the control unit 63 when there are multiple audio and video application program, the control unit 63 is further configured to: in a case in which there are multiple audio and video application programs, determine that an audio and video application program having a highest priority is an audio and video application program that may require to be controlled by the control unit 63 according to the action performed by the user on an external electronic device or the electronic device.

Corresponding to the foregoing Embodiment 3, in another specific embodiment of Embodiment 5, a sensor is disposed on the electronic device, the audio and video application program is specifically a call application, and the external audio device is connected to the electronic device in a wireless manner. The control unit 63 is specifically configured to: when the electronic device receives an incoming call and the action performed by the user on the electronic device is moving the electronic device close to the head of the user, automatically answer the call, and control call audio to be output from a built-in earpiece of the electronic device; or when the electronic device is in a call and the action performed by the user on the electronic device is moving the electronic device close to the head of the user, control call audio to be output from a built-in earpiece of the electronic device; or when the electronic device is in a call and the action performed by the user on the electronic device is moving the electronic device away from the head of the user, control call audio to be output from the external audio device.

Corresponding to Embodiment 4, in still another more specific embodiment of Embodiment 5, the control unit 63 can further determine whether a gesture answer function has been activated for the electronic device. The control unit 63 is specifically configured to: when the electronic device receives an incoming call and the action performed by the user on the electronic device is moving the electronic device close to the head of the user, determine whether a gesture answer function has been activated for the electronic device, where the gesture answer function refers to a function for the electronic device to identify a user gesture and respond to the identified user gesture to automatically answer the call; and when the gesture answer function has been activated for the electronic device, control the electronic device to automatically answer the call, and control the call audio to be output from the built-in earpiece of the electronic device.

More specifically, the control unit 63 can further determine whether an intelligent call function has been activated for the electronic device. The control unit 63 is specifically configured to determine whether an intelligent call switching function has been activated for the electronic device, where the intelligent call switching function refers to a function for the electronic device to automatically respond to the action performed by the user on the electronic device to automatically switch a call audio output channel; and when the intelligent call switching function has been activated for the electronic device, control the electronic device to automatically answer the call, and control the call audio to be output from the built-in earpiece of the electronic device; or when the intelligent call switching function is not activated for the electronic device, control the electronic device to automatically answer the call, and control the call audio to be output from the external audio device.

Embodiment 6

Corresponding to Embodiment 1, Embodiment 6 is used to describe an electronic device provided in the present invention. The electronic device is connected to an external audio device. The external audio device is an audio device that can be connected to the electronic device in a wired or wireless manner. A sensor is disposed on at least one of the electronic device or the external audio device, where when a sensor is disposed on the electronic device, the sensor disposed on the electronic device is configured to detect that a user moves the electronic device close to or away from the head of the user; and when a sensor is disposed on the external audio device, the sensor disposed on the external audio device is configured to detect that the user wears and/or takes off the external audio device.

Figure 7:
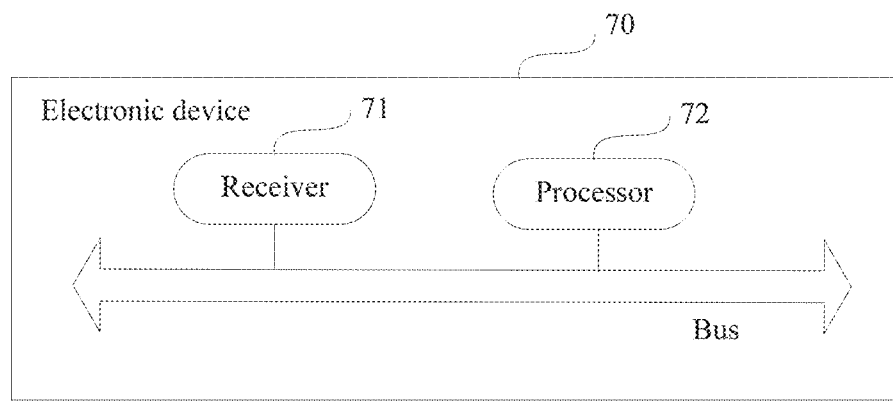
FIG. 7 is a schematic structural diagram of an electronic device according to Embodiment 6.

FIG. 7 is a schematic structural diagram of the electronic device according to Embodiment 6. As shown in FIG. 7, the electronic device 70 in this embodiment includes: at least one receiver 71, a processor 72, and a bus. By using the bus, the receiver 71 and the processor 72 are connected to each other and communicate with each other. The bus may be an Industry Standard Architecture (ISA for short) bus, a Peripheral Component Interconnect (PCI for short) bus, an Extended Industry Standard Architecture (EISA for short) bus, or the like. The bus may be classified into an address bus, a data bus, a control bus, or the like. For convenience of indication, the bus is indicated by using only one bold line in FIG. 7, which, however, does not indicate that there is only one bus or one type of bus. As shown in FIG. 7, the electronic device 70 includes: the receiver 71, configured to receive a detection result signal sent by the sensor that is disposed on at least one of the electronic device 70 or the external audio device, where the detection result signal carries a detection value obtained by means of detection by the sensor; and the processor 72, configured to determine, according to a preset correspondence between a user action and a detection value and according to the detection value carried in the detection result signal, an action performed by the user on the electronic device 70 or the external audio device, where the action performed by the user on the electronic device 70 includes that the user moves the electronic device 70 close to or away from the head of the user, and the action performed by the user on the external audio device includes that the user wears or takes off the external audio device, where the processor 72 is further configured to control an execution status of an audio and video application program according to the action performed by the user on the electronic device 70 or the external audio device.

According to the electronic device 70 provided in Embodiment 6, the electronic device 70 can explore a corresponding user requirement that is implied by the action performed by the user on the electronic device 70 or the external audio device, and perform a corresponding control action to satisfy the user requirement, which therefore can make a manner used by the electronic device to control, in the state in which the electronic device 70 is connected to the external audio device, the audio and video application program simpler, so that the user operates easily, and higher intelligentization is achieved.

Corresponding to Embodiment 2, in a specific embodiment of Embodiment 6, a sensor is disposed on the external audio device, and the external audio device is specifically a headset. The processor 72 is specifically configured to: determine a current execution status of the audio and video application program, where the execution status includes not started, running, and paused; and when the action performed by the user on the headset is taking off the headset and the execution status is running, control the audio and video application program to be paused; or when the action performed by the user on the headset is taking off the headset and the execution status is not started or is paused, control the audio and video application program to remain not started or remain paused; or when the action performed by the user on the headset is wearing the headset and the execution status is not started or is paused, control the audio and video application program to start to run or continue running; or when the action performed by the user on the headset is wearing the headset and the execution status is running, control the audio and video application program to remain running.

To prevent an error from occurring in control by the processor 72 when there are multiple audio and video application programs, the processor 72 is further configured to: in a case in which there are multiple audio and video application programs, determine that an audio and video application program having a highest priority is an audio and video application program that may require to be controlled by the processor 72 according to the action performed by the user on the electronic device and the external audio device.

Corresponding to Embodiment 3, in another specific embodiment of Embodiment 6, a sensor is disposed on the electronic device 70, the external audio device is connected to the electronic device 70 in a wireless manner, and the audio and video application program is specifically a call application. The processor 72 is specifically configured to: when the electronic device 70 receives an incoming call and the action performed by the user on the electronic device 70 is moving the electronic device 70 close to the head of the user, control the electronic device 70 to automatically answer the call, and control call audio to be output from a built-in earpiece of the electronic device 70; or when the electronic device 70 is in a call and the action performed by the user on the electronic device 70 is moving the electronic device 70 close to the head of the user, control call audio to be output from a built-in earpiece of the electronic device 70; or when the electronic device 70 is in a call and the action performed by the user on the electronic device 70 is moving the electronic device 70 away from the head of the user, control call audio to be output from the external audio device.

Corresponding to Embodiment 4, in still another more specific embodiment of Embodiment 6, the processor 72 is specifically configured to: when the electronic device 70 receives an incoming call and the action performed by the user on the electronic device 70 is moving the electronic device 70 close to the head of the user, determine whether a gesture answer function has been activated for the electronic device 70, where the gesture answer function refers to a function for the electronic device to identify a user gesture and respond to the identified user gesture to automatically answer the call; and when the gesture answer function has been activated for the electronic device 70, control the electronic device 70 to automatically answer the call, and control the call audio to be output from the built-in earpiece of the electronic device 70.

More specifically, more specifically, the processor 72 can further determine whether an intelligent call function has been activated for the electronic device 70. The processor 72 is specifically configured to determine whether an intelligent call switching function has been activated for the electronic device 70, where the intelligent call switching function refers to a function for the electronic device to automatically respond to the action performed by the user on the electronic device to automatically switch a call audio output channel; and when the intelligent call switching function has been activated for the electronic device 70, control the electronic device 70 to automatically answer the call, and control the call audio to be output from the built-in earpiece of the electronic device 70; or when the intelligent call switching function is not activated for the electronic device 70, control the electronic device 70 to automatically answer the call, and control the call audio to be output from the external audio device.

The embodiments in this specification are described with emphasis, for same or similar parts in the embodiments, cross-reference may be made, and each embodiment focuses on a difference from another embodiment. Especially, an apparatus embodiment is basically similar to a method embodiment, and therefore is described briefly; for related parts, reference may be made to partial descriptions in the method embodiment.

It should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. In addition, in the accompanying drawings of the apparatus embodiments provided by the present invention, connection relationships between the modules indicate that the modules have communication connections with each other, which may be specifically implemented as one or more communications buses or signal cables. A person of ordinary skill in the art may understand and implement the embodiments of the present invention without creative efforts.

A person of ordinary skill in the art may understand that, each aspect of the present invention or a possible implementation manner of each aspect may be specifically implemented as a system, a method, or a computer program product. Therefore, each aspect of the present invention or a possible implementation manner of each aspect may use forms of hardware only embodiments, software only embodiments (including firmware, resident software, and the like), or embodiments with a combination of software and hardware, which are uniformly referred to as "circuit", "module", or "system" herein.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method comprising:
    receiving, by a terminal device, an incoming call, wherein the terminal device has a direct device-to-device connection to an external audio device when the incoming call is received, and incoming calls are answerable using a built-in earpiece of the terminal device or using the external audio device;
    detecting, by the terminal device, that a gesture corresponding to a gesture answer function has been performed by a user when the terminal device is moving towards the user's head;
    after detecting, by the terminal device, that the gesture corresponding to the gesture answer function has been performed by the user, determining, by the terminal device, whether the gesture answer function is currently activated in the terminal device, wherein the gesture answer function is currently activated when the user has previously activated the gesture answer function in the terminal device prior to the gesture being performed;
    in response to determining that the gesture answer function is currently activated in the terminal device, determining, by the terminal device, whether an intelligent call switching function is currently activated, wherein the intelligent call switching function is currently activated when the user has previously activated the intelligent call switching function prior to the gesture being performed;
    in response to determining that the gesture answer function is currently activated in the terminal device, and in response to determining that the intelligent call switching function is not currently activated in the terminal device, answering, by the terminal device, the incoming call, and outputting a call audio output channel to the external audio device; and
    in response to determining that the gesture answer function is currently activated in the terminal device, and in response to determining that the intelligent call switching function is currently activated in the terminal device, answering, by the terminal device, the incoming call, and outputting the call audio output channel to the built-in earpiece of the terminal device.

2. The method according to claim 1, wherein the method further comprises:
    displaying, by the terminal device, an incoming call reminding interface of the incoming call, after receiving the incoming call.

3. The method according to claim 1, wherein the method further comprises: setting a menu option for activating or deactivating the gesture answer function.

4. The method according to claim 1, further comprising:
    acquiring, by a sensor located at the terminal device, a first detection value, wherein the sensor is an optical proximity sensor, a light sensor, or a temperature sensor; and
    wherein detecting that the terminal device is moving towards the user's head comprises determining that the first detection value is within a first preset range.

5. The method according to claim 4, wherein the sensor is an optical proximity sensor, and wherein acquiring the first detection value is performed by the optical proximity sensor.

6. The method according to claim 4, wherein the method further comprises:
    acquiring, by the sensor, a second detection value;
    detecting, by the terminal device, that a user is moving the terminal device away from the user's head by determining that the second detection value is within a second preset range; and
    outputting, by the terminal device, call audio of the incoming call from an external audio device.

7. The method according to claim 4, wherein the sensor is a temperature sensor, and wherein the first detection value is acquired by the temperature sensor.

8. The method according to claim 6, wherein external audio device is a headset.

9. A terminal device, comprising:
    a processor; and
    a non-transitory computer readable storage medium storing a program for execution by the processor, the program including instructions to:
    receive an incoming call, wherein the terminal device has a direct device-to-device connection to an external audio device when the incoming call is received, and incoming calls are answerable using a built-in earpiece of the terminal device or using the external audio device;
    after receiving the incoming call, detect that a gesture corresponding to a gesture answer function has been performed by a user when the terminal device is moving towards a user's head;

after determining that the gesture corresponding to the gesture answer function has been performed, determine whether a gesture answer function is currently activated in the terminal device, wherein the gesture answer function is currently activated when the user has previously activated the gesture answer function in the terminal device prior to the gesture being performed;

in response to determining that the gesture answer function is currently activated in the terminal device, determine whether an intelligent call switching function is currently activated in the terminal device, wherein the intelligent call switching function is currently activated in the terminal device when the user has previously activated the intelligent call switching function prior to the gesture being performed;

in response to determining that the gesture answer function is currently activated in the terminal device, and in response to determining that the intelligent call switching function is not currently activated in the terminal device, answering the incoming call, and outputting a call audio output channel to the external audio device; and in response to determining that the gesture answer function is currently activated in the terminal device, in response to determining that the intelligent call switching function is currently activated, answering the incoming call, and outputting the call audio output channel to the built-in earpiece of the terminal device.

10. The terminal device according to claim 9, wherein the terminal device further comprises a display, and wherein the display is configured to display an incoming call reminding interface of the incoming call.

11. The terminal device according to claim 10,
wherein the instructions further comprises instructions to acquire, by a sensor located at the terminal device, a first detection value, wherein the sensor is an optical proximity sensor, a light sensor, or a temperature sensor; and wherein detecting that the terminal device is moving towards the user's head comprises determining that the first detection value is within a first preset range.

12. The terminal device according to claim 11, wherein the sensor is an optical proximity sensor, and wherein the optical proximity sensor is configured to acquire the first detection value.

13. The terminal device according to claim 12, wherein the optical proximity sensor is configured to acquire a second detection value, and wherein the instructions further comprise instructions to:

acquire the second detection value;

detect that a user is moving the terminal device away from the user's head by determining that the second detection value is within a second preset range; and output call audio of the incoming call from an external audio device.

14. The terminal device according to claim 11, wherein the instructions further comprise instructions to:

acquire a second detection value;

detect that a user is moving the terminal device away from the user's head by determining that the second detection value is within a second preset range; and output call audio of the incoming call from an external audio device.

15. The terminal device according to claim 9, wherein the instructions further comprise instructions to:

set a menu option for activating or deactivating the gesture answer function.

16. A method, comprising:

receiving, by a terminal device, an incoming call, wherein the terminal device has a direct device-to-device connection to an external audio device when the incoming call is received, and incoming calls are answerable using a built-in earpiece of the terminal device or using the external audio device;

displaying, by the terminal device, an incoming call reminding interface of the incoming call;

detecting, by the terminal device, that a gesture according to a gesture answer function has been performed by a user when the terminal device is moving towards a user's head;

in response to detecting that the gesture corresponding to the gesture answer function has been performed, determining, by the terminal device, whether the gesture answer function is currently activated, wherein the gesture answer function is currently activated when the user has previously activated the gesture answer function in the terminal device prior to the gesture being performed;

in response to determining that the gesture answer function is not currently activated in the terminal device, waiting, by the terminal device, for the user to answer the incoming call using the external audio device, wherein the user answers the incoming call by performing a second gesture on the external audio device, and outputting a call audio output channel to the external audio device;

in response to determining that the gesture answer function is currently activated, determining, by the terminal device, whether an intelligent call switching function is currently activated, wherein the intelligent call switching function is currently activated when the user has previously activated the intelligent call switching function prior to the gesture being performed;

in response to determining that the gesture answer function is currently activated in the terminal device, and in response to determining that the intelligent call switching function is not currently activated, answering, by the terminal device, the incoming call, and outputting the call audio output channel to the external audio device; and in response to determining that the gesture answer function is not currently activated in the terminal device, and in response to determining that the intelligent call switching function is currently activated, answering, by the terminal device, the incoming call, and outputting the call audio output channel to the built-in earpiece of the terminal device.

17. The method of claim 16, further comprising:

acquiring, by a sensor located at the terminal device, a first detection value, wherein the sensor is an optical proximity sensor, a light sensor, or a temperature sensor; and wherein detecting that the terminal device is moving towards the user's head comprises determining that the first detection value is within a first preset range.

18. The method according to claim 16, further comprising:

setting a menu option for activating or deactivating the intelligent call switching function.

19. The method according to claim 16, further comprising:
- during the incoming call, re-detecting, by the terminal device, that the terminal device is moving towards the user's head;
- in response to re-detecting that the terminal device is moving towards the user's head, determining whether the intelligent call switching function is currently enabled;
- in response to re-detecting that the terminal device is moving towards the user's head and in response to determining that the intelligent call switching function is not currently activated, continuing to output the call audio output channel to the external audio device; and
- in response to re-detecting that the terminal device is moving towards the user's head and in response to determining that the intelligent call switching function is currently activated, switching, by the terminal device, the call audio output channel to be output by the built-in earpiece of the terminal device.

\* \* \* \* \*